United States Patent [19]

Wagner

[11] Patent Number: 4,688,080
[45] Date of Patent: Aug. 18, 1987

[54] MULTI-STANDARD ADAPTIVE CHROMINANCE SEPARATOR

[75] Inventor: Steven D. Wagner, San Jose, Calif.

[73] Assignee: Ampex Corporation, Redwood City, Calif.

[21] Appl. No.: 781,843

[22] Filed: Sep. 27, 1985

[51] Int. Cl.[4] .............................................. H04N 9/78
[52] U.S. Cl. ..................................................... 358/31
[58] Field of Search .............................. 358/21 R, 31

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,456,921 | 6/1984 | Hess | 358/31 |
| 4,498,100 | 2/1985 | Bunting | 358/31 |

OTHER PUBLICATIONS

Watkinson, "Variable-Speed Video Playback", Feb. 85, Electronics and Wireless World, pp. 69-72.
Kaiser, "Comb Filter Improvement with Spurious Chroma Deletion", SMPTE Journal, Jan. 77, vol. 86, No. 1, pp. 1-5.

Primary Examiner—Michael A. Masinick
Attorney, Agent, or Firm—George B. Almeida; Joel D. Talcott

[57] ABSTRACT

An adaptive chrominance separator is provided which responds to horizontal high frequency luminance detail as well as to vertical chrominance detail. The luminance and chrominance levels are detected and an adaptive decision is made, depending upon the relative levels, of whether to use a bandpass filter, a comb filter or the averaged outputs of both filters, to provide more accurate separation of the chrominance.

27 Claims, 5 Drawing Figures

FIG_2

FIG_3B

FIG 4

MULTI-STANDARD ADAPTIVE CHROMINANCE SEPARATOR

BACKGROUND AND SUMMARY OF THE INVENTION

This invention relates to the separation of chrominance and luminance frequency components of a composite video signal, and particularly to a multi-standard adaptive chrominance separator which responds to horizontal high frequency luminance detail as well as to vertical chroma detail.

In the course of recovering video signals previously recorded on, for example, a magnetic video tape, various signal processing functions such as color processing and dropout correction are employed to insure the integrity of the video signal. Further, in sophisticated videotape recorders, color pictures are provided at non-standard speeds such as, for example, shuttle, stop and slow motion speeds, which requires additional video processing procedures such as video noise reducing. These various color video signal processes generally are performed in circuitry conventionally known as an output processor, located within a time base corrector (TBC) device. In order to perform these, and other, processes on a color video signal, it first is necessary to separate the chrominance and luminance frequency components of the composite color video signal recovered from the videotape, whereby the chrominance frequency component may be variously manipulated separately from the luminance frequency component.

The periodic nature of television scanning and the frequency-interleaving formats of a television picture (as in the NTSC and PAL color television standards) together produce a signal having a spectral distribution, wherein signal energy appears in discrete bands separated by energy nulls at intervals of line-scanning frequency. At higher frequencies, luminance and chrominance appear interleaved, separated by one-half line frequency. Accordingly, in order to provide the high quality signal processing required in recovering color video signals from videotape at non-standard speeds, precise separation of these luminance and chrominance frequency components in the frequency region of, for example, 3.58 MHz in the NTSC color television standard, is essential.

To this end, comb filters with their pass-band and stop-band characteristics are very effective in passing or rejecting one or the other of the luminance and chrominance frequency components which make up the composite video signal. That is, comb filters are more efficient in separating the components than are bandpass filters since the latter also separate out any high frequency signals other than chrominance, for example, luminance frequency component signals, which may fall in the chrominance passband of 3.58 MHz (NTSC) subcarrier frequency. Since the luminance component has no subcarrier it tends to be similar on a number of successive lines. Thus, adding the values of three successive horizontal scan lines (termed "top", "middle" and "bottom" data lines) using a comb filter with a weighting factor of one-half the middle line and minus one-quarter of the top and bottom lines, provides a luminance frequency component value of nearly zero. It follows that a comb filter will provide a chrominance frequency component signal with less luminance frequency component remaining than will a bandpass filter.

However, a comb filter has the inherent disadvantage of averaging video from several adjacent lines together. In a situation where a sudden color change occurs from one scan line to the next one or two lines, the comb filter averages the vertical color transition resulting in a blurred or "soft" color transition which is sufficiently visible to be objectionable.

In the area of chrominance and luminance separation of an NTSC-encoded color television signal, there is available a scheme for detecting the occurrence of vertical chrominance transitions, and for making a decision of whether to employ a comb filter to perform separation of luminance and chrominance, or whether to maintain the luminance component separation process via use of a lowpass filter. Such a scheme is typical of the latest techniques presently available in the art of chroma/luminance separation, and thus is discussed here. The scheme detects any difference in chrominance between the top and bottom lines of three adjacent lines, and compares the difference indicative of vertical chrominance change to a fixed reference corresponding to a preselected, manually adjusted, threshold level. A gating signal is generated in the situations where sufficient vertical chrominance change exists between lines which, in turn, causes the signal to be filtered by the lowpass filter to remove spurious chrominance frequency components. If there is little or no vertical chrominance difference, the scheme passes the wideband delayed luminance signal.

The schemes of bypassing a comb filter when vertical chrominance detail is detected have the disadvantage that they may erroneously bypass the comb filter in situations where it is preferable not to, because horizontal luminance detail is not considered when making the bypass decision. As generally known and discussed above, the horizontal luminance component is best separated by a comb filter and accordingly there are situations where the detection of vertical chrominance detail should not be used to determine that the comb filter be bypassed. For example, high frequency luminance components which fall in the chrominance signal passband generate a situation where a comb filter should be employed. However, in the above type of scheme the decision to bypass the comb filter is made erroneously based only on the vertical chrominance component level. This allows the horizontal high frequency luminance to pass along with the chrominance signal, whereupon the luminance is modified as though it were chrominance in subsequent color signal processing circuits, resulting in the generation of corresponding undesirable artifacts in the picture. In addition, the vertical chrominance component level is compared against a fixed voltage level reference arrived at subjectively. Thus, in such a scheme, a change in the video input signal level causes a corresponding, and erroneous, change in the fixed level comparison of the vertical chrominance component.

Further, presently available chroma separators have the disadvantage of switching between the conventional bandpass filter output and the comb filter output; i.e., essentially switch the comb filter into, and out of, the luminance/chrominance separating system to provide the chrominance output signal. Since there can be a significant difference between the output signals generated by the bandpass filter and the comb filter, abruptly bypassing the comb filter may produce a disturbance in the picture.

Still another disadvantage of present chroma separators is their inability to be readily adapted to a switchable implementation for use with the present color television standards such as NTSC and PAL, particularly in a common piece of apparatus.

The invention overcomes the disadvantages of present chroma separators and provides a digital multistandard system which makes a comb filter bypass decision based not only on the vertical chrominance detail, but also on the horizontal high frequency luminance detail in the television picture. In essence, the bypass decision is based on the more efficient use of the relative levels of both the chrominance and luminance detail in the picture. More particularly, the invention compares the vertical chrominance signal level against the horizontal high frequency luminance signal level, not against a fixed voltage level reference, and makes an adaptive decision based on the relative signal levels. The adaptive decision is made on a sample-by-sample basis. As a further advantage the adaptive decision is not affected by changes in the video input signal level.

In addition, the invention provides not only bandpass filter and comb filter outputs, but further provides an average chrominance signal output which is the average of the bandpass and comb filter signals. Thus in situations where there is a significant difference between the chrominance and luminance levels on adjacent lines, the adaptive decision steps through the average output when switching from bandpass to comb filter outputs, and vice versa. This provides a more gradual change in chrominance signal output and minimizes the generation of any corresponding disturbance in the picture, that is, reduces any disturbance by one-half.

Still further, the present digital adaptive chroma separator provides the highly desirable advantage of readily being adaptable to use with all present color television standards and thus contemplates a single piece of apparatus which accommodates the NTSC, PAL and SECAM standards.

To this end, the invention includes a chrominance comb filter for receiving three adjacent lines of video from a bandpass filter, and for supplying the usual bandpass chrominance signal and a comb chrominance signal to respective positions of an adaptive switch. The bandpass and comb chrominance signals also are coupled to an adder which supplies an average chrominance signal formed of one-half the sum of the bandpass and comb filter chrominance signals. This average chrominance signal also is coupled to the adaptive switch. In addition, the bandpass and comb filters are coupled to an adaptive switch controller means formed of a vertical chrominance detector channel and a horizontal high frequency luminance detector channel. The detector channels are, in turn, coupled to a comparison function means which generates an adaptive switch control signal in response to the relative comparison of the vertical chrominance level and the horizontal high frequency luminance level. The switch control signal is, for example, a 2-bit word which enables one of the three positions of the adaptive switch, to provide accordingly one of the three respective chrominance output signals.

DESCRIPTION OF THE PREFERRED EMBODIMENTS

Figure 1:
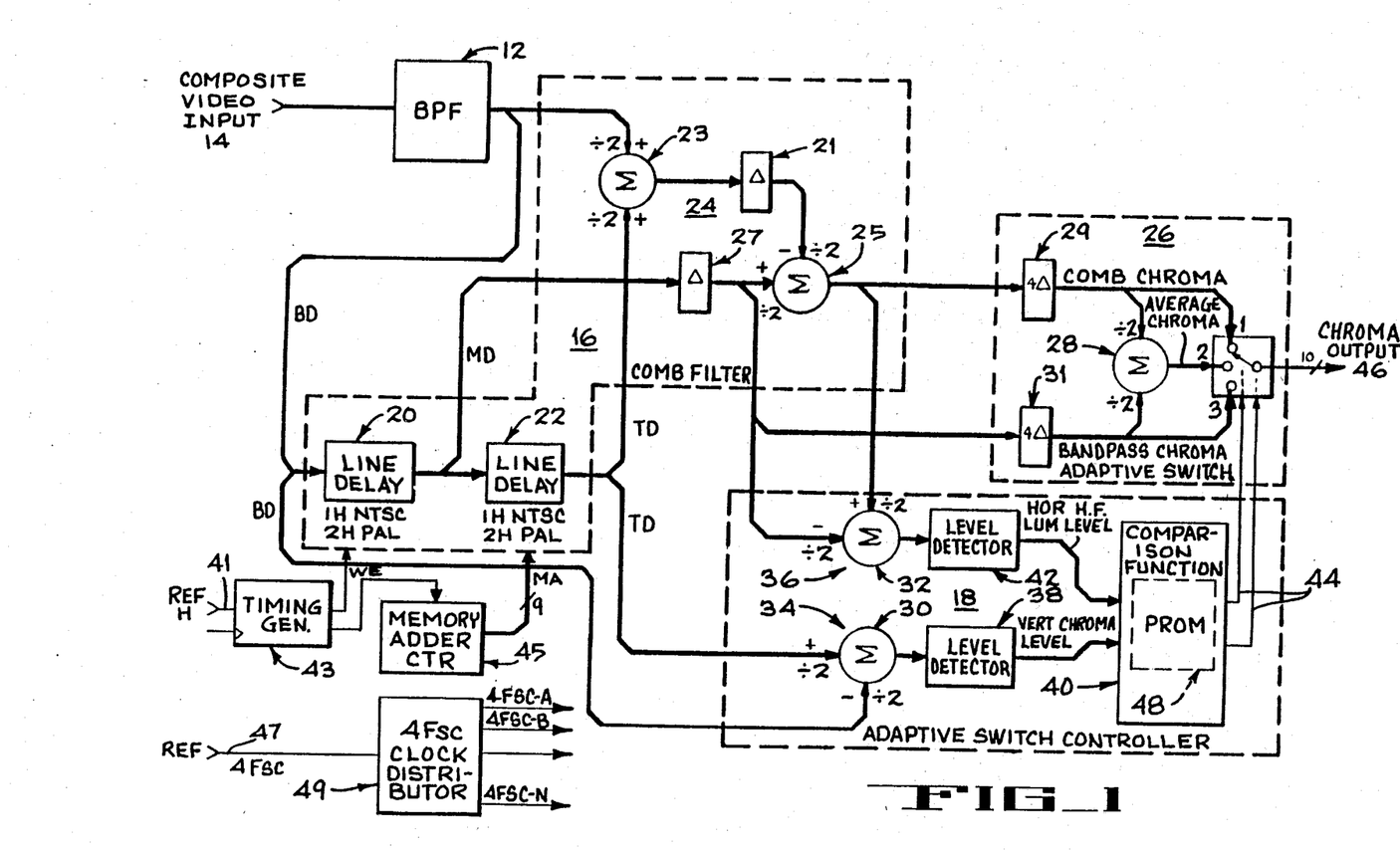
FIG. 1 is a block diagram depicting the adaptive chrominance separator of the invention combination.

Referring to FIG. 1, a composite color video signal such as generated in a NTSC, PAL or SECAM color television standard system, is supplied to a digital chrominance bandpass filter 12 as a continuous stream of digitized samples via a video data bus 14. The signal, comprising for example, 8-bit words, is bandpass filtered by filter 12 to select frequencies near the subcarrier frequency (3.58 MHz in NTSC/PAL-M and 4.43 MHz in PAL/SECAM color television standards) and to attenuate those away from subcarrier. The resulting digital bandpass signal is supplied as a stream of 11-bit words to a digital chrominance comb filter means 16, as well as to an adaptive switch controller means 18. In a NTSC system, the comb filter means 16 include two serial one line (1H) delays 20, 22 and first and second adders 23, 25 of an adder means 24. In a PAL system the delays 20 and 22 are two line delays in length, as further described below. The input of 1H delay 20 receives the bandpass signal from the bandpass filter 12, and the output of 1H delay 22 is coupled to an input of the first adder 23. The bandpass filter 12 also is coupled to a second input of the first adder 23. The output of the adder 23 is coupled to a small delay 21 of one 4Fsc clock delay, and thence to one input of the adder 25. The other input of adder 25 is coupled to the output of the 1H delay 20 via a small delay 27 of one 4Fsc clock delay. Adder 25 supplies the comb chrominance signal.

As may be seen, 1H delay 22 supplies a 2H delayed signal herein termed a "top" line data (TD) signal, the 1H delay 20 supplies a 1H delayed signal termed a "middle" line data (MD) signal, and the bandpass filter 12 supplies an undelayed signal herein termed a "bottom" line data (BD) signal. The top, middle and bottom line data signals are streams of digitized samples derived from vertically adjacent positions of the corresponding three adjacent horizontal scan lines. By way of example only, for an NTSC standard comb filter, the combined effect of the adders 23 and 25 provides at the output of the comb filter 16 the TD signal weighted by a coefficient of $-\frac{1}{4}$, the MD signal weighted by a coefficient of $+\frac{1}{2}$, and the BD signal weighted by a coefficient of $-\frac{1}{4}$. That is, the resulting output from the adder means 24 is the comb chrominance signal, which is coupled to position-1 of an adaptive switch 26 via a small delay 29 of four 4Fsc clock delays. The MD signal from 1H delay 20 is the bandpass chrominance signal with 1H delay and is coupled to a position-3 of the adaptive switch 26 via the small delay 27 and a second small delay 31 of four 4Fsc clock delay. An adder means 28 receives both the comb chrominance and the bandpass chrominance signals via respective small delays 29, 31, provides a weighting coefficient of $+\frac{1}{2}$ to each signal, and supplies the resulting "average" chrominance signal to a position-2 of the adaptive switch 26. It follows that adaptive switch 26 may supply the comb, bandpass or average chrominance signal when the respective switch positions 1, 3 or 2 are enabled in response to a gating control signal supplied thereto. The small delays 21, 27, 29 and 31 provide timing delays to match the various chrominance signal paths, as commonly done in the art.

The adaptive switch controller means 18 of previous mention include a pair of adders 30, 32 of a vertical chrominance detection channel 34 and a horizontal high frequency luminance detection channel 36, respectively. The input signals are supplied as continuous streams of digital samples from three adjacent lines. Each channel includes circuits for squaring each sample, for then weighting the three adjacent samples by selected weighting coefficients, and finally for taking the square root of the summation of the three samples. Since only the power, or energy, of the luminance and chrominance signals are of interest, the polarities or frequency are irrelevant. The sine wave signals from the adders thus are converted to respective DC levels which are indicative of the chrominance and luminance detail in the picture.

More particularly, the TD and BD signals are supplied to the adder 30, with the TD signal being weighted by a coefficient of $+\frac{1}{2}$ and the BD signal being weighted by $-\frac{1}{2}$. The resulting vertical chrominance signal is supplied as a sine wave to a digital chrominance RMS level detector 38 which, in turn, supplies a corresponding vertical chrominance level to a comparison function means 40.

The adder 32 may be a pair of cascaded two-input adders, but is simplified herein as a two input adder which receives the comb chrominance signal from the adder 25, and the MD signal from the small delay 27. The adder 32 comprises essentially a luminance comb filter wherein the negative middle line data signal is subtracted from the comb chrominance signal. The resulting luminance signal in effect is formed of the TD signal weighted by a coefficient of $+\frac{1}{4}$, the MD signal weighted by $+\frac{1}{2}$ and the BD signal weighted by $+\frac{1}{4}$. The luminance signal is supplied as a sine wave to a digital luminance RMS level detector 42, whose output comprises a horizontal high frequency luminance level which also is supplied to the comparison function means 40.

The comparison function means 40 includes means for making a digital comparison of the vertical chrominance level and the horizontal high frequency luminance level, and for generating a digital adaptive gating control signal on a pair of control lines 44. The latter are coupled to the adaptive switch 26 to control the selection of the switch position commensurate with the relative levels of the chrominance and luminance signals, as further described below. The control lines 44 supply a 2-bit digital word which enables the adaptive switch 26 to the position which supplies the desired signal of the three chrominance signals at the output of the adaptive chrominance separator, that is, at a chrominance output bus 46.

In an NTSC standard, the 1H delays 20, 22 comprise RAM-based one line memories (not shown) which are controlled by the usual write enable (WE) and memory address (MA) signals. In a PAL standard, the delays 20, 22 of two lines length also are controlled by the write enable and the memory address signals, wherein the RAM-based memories have twice the number of addresses. To this end a reference H signal is supplied via line 41 to a timing generator 43, which is clocked by inverted 4Fsc. The timing generator 43 provides the WE signals to the delays 20, 22, and a timing signal to a memory address counter 45. The latter, in turn, supplies a delay memory address to the delays 20 and 22 via a 9-bit address bus.

In addition, a reference 4Fsc clock signal is supplied via a line 47 to a 4Fsc clock distributor 49, which includes a plurality of gates (not shown) for supplying the various 4Fsc clock signals employed in the present adaptive chrominance separator.

In operation, the adder 30 of the vertical chrominance level detection channel 34, subtracts across two lines, i.e., the top and bottom data lines, to provide a sine wave signal having a frequency of about the subcarrier frequency, which signal's amplitude is indicative of the vertical chrominance difference between the lines. The detector 38 converts the sine wave signal to a DC level commensurate with the amplitude of the sine wave.

The luminance level detection channel 36 is identical to the chrominance level detection channel 34 and supplies a DC level commensurate with the horizontal high frequency luminance amplitude. The digital comparison function means 40 includes a programmable read-only-memory (PROM), indicated by numeral 48, in which is stored every possible condition of the vertical chrominance and the horizontal high frequency luminance DC levels. The two levels are compared and the adaptive gating control signal is generated on lines 44 to determine accordingly the position of the adaptive switch 26. It may be seen that the adaptive decisions supplied from the comparison function means 40 are made on a sample-by-sample basis over the entire television picture.

Figure 2:
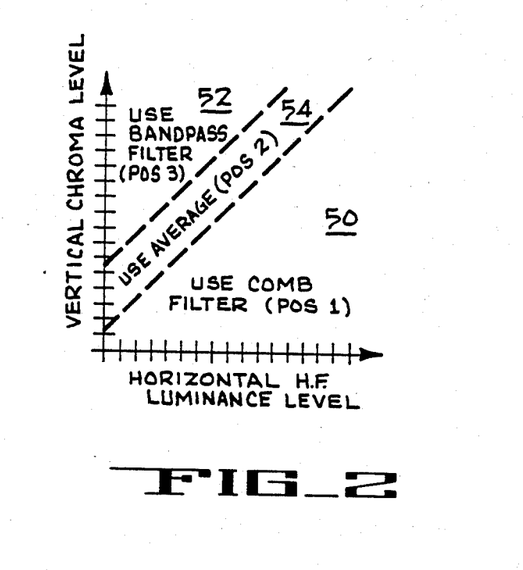
FIG. 2 is a graph depicting a typical comparison function of the vertical chrominance level and the horizontal high frequency luminance level as employed in the comparison function means of FIG. 1.

To illustrate, referring to FIG. 2, a typical comparison function for the means 40 of FIG. 1 is shown in the form of a two-dimensional graph plotting the vertical chrominance level on the x-axis, and the horizontal high frequency luminance level on the y-axis. Both axes are divided into, for example, sixteen points to define a grid of 256 squares corresponding to the 256 digital values available from the 8-bit digital word supplied to the PROM 48. Every possible condition of the 256 squares depicted in FIG. 2 is stored in the PROM 48. The graph is subjectively divided into three areas; a first area 50 corresponding to the chrominance/luminance condition where the comb filter 16 provides the preferred separation characteristics (adaptive switch position-1); a second area 52 where the bandpass filter 12 provides the preferred operation (adaptive switch position-3); and a third area 54 where the average chrominance signal provides the preferred separation characteristics (adaptive switch position-2). Accordingly, if the vertical chrominance level is significantly greater than the horizontal high frequency luminance level, the comparison function means 40 supplies a digital control signal which directs the adaptive switch 26 to position-3 to supply the bandpass chrominance signal via the bandpass filter 12. If the horizontal high frequency luminance level is significantly greater than the vertical chrominance level, the means 40 supplies a digital control signal which selects position-1 of the adaptive switch 26 to supply the comb chrominance signal via the comb filter 16. If the horizontal high frequency luminance level and the vertical chrominance level are essentially equal, the digital control signal selects the position-2 of the adaptive switch 26 to supply the average chrominance signal via the bandpass and comb filters and the adder 28. Thus the chrominance/luminance separation is made by an adaptive decision based on the relative signal levels. Note that the adaptive decision is not affected by a change in the level of the composite video on input bus 14.

Figure 3A:
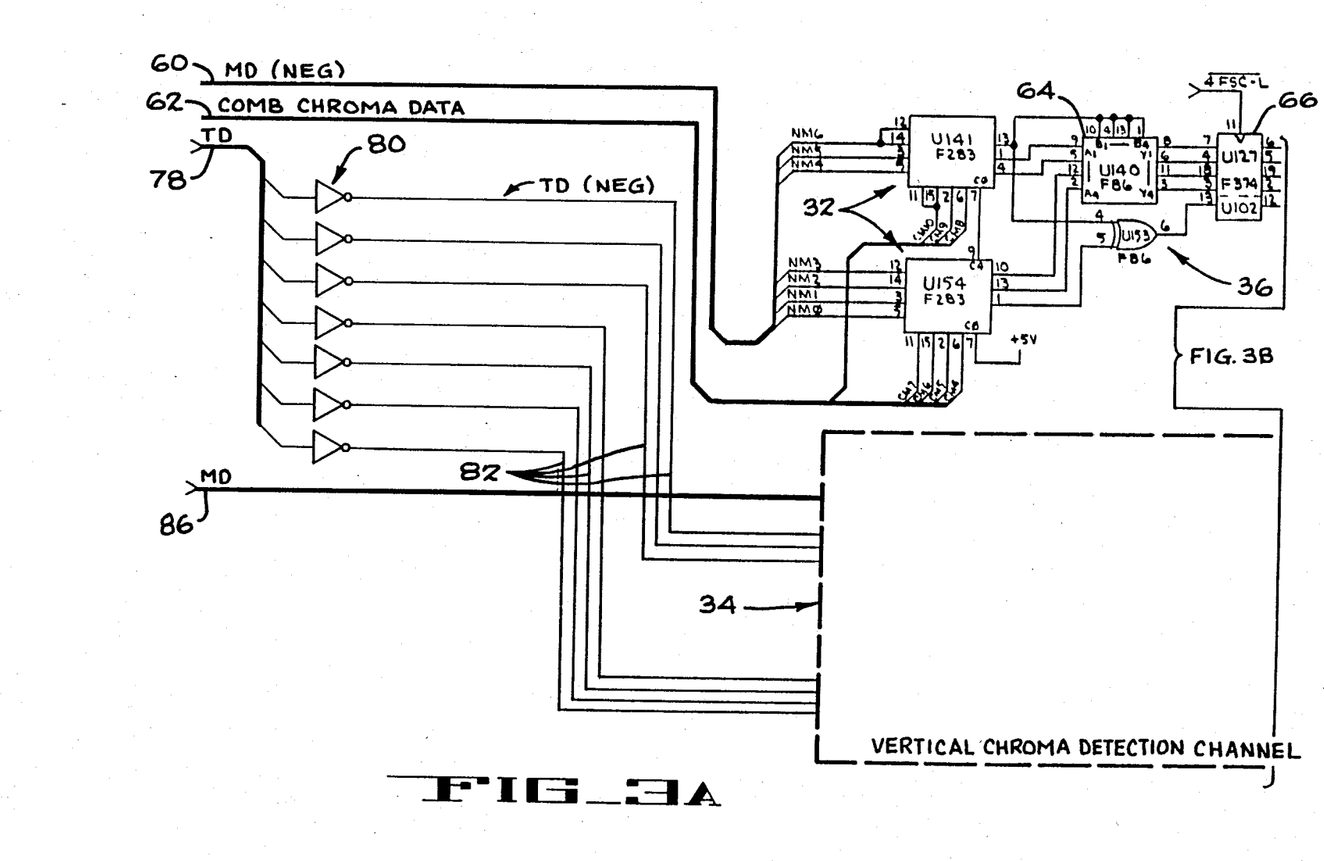
FIGS. 3A, 3B are a schematic diagram of an implementation of the adaptive switch controller means of the invention combination depicted in FIG. 1.
Figure 3B:
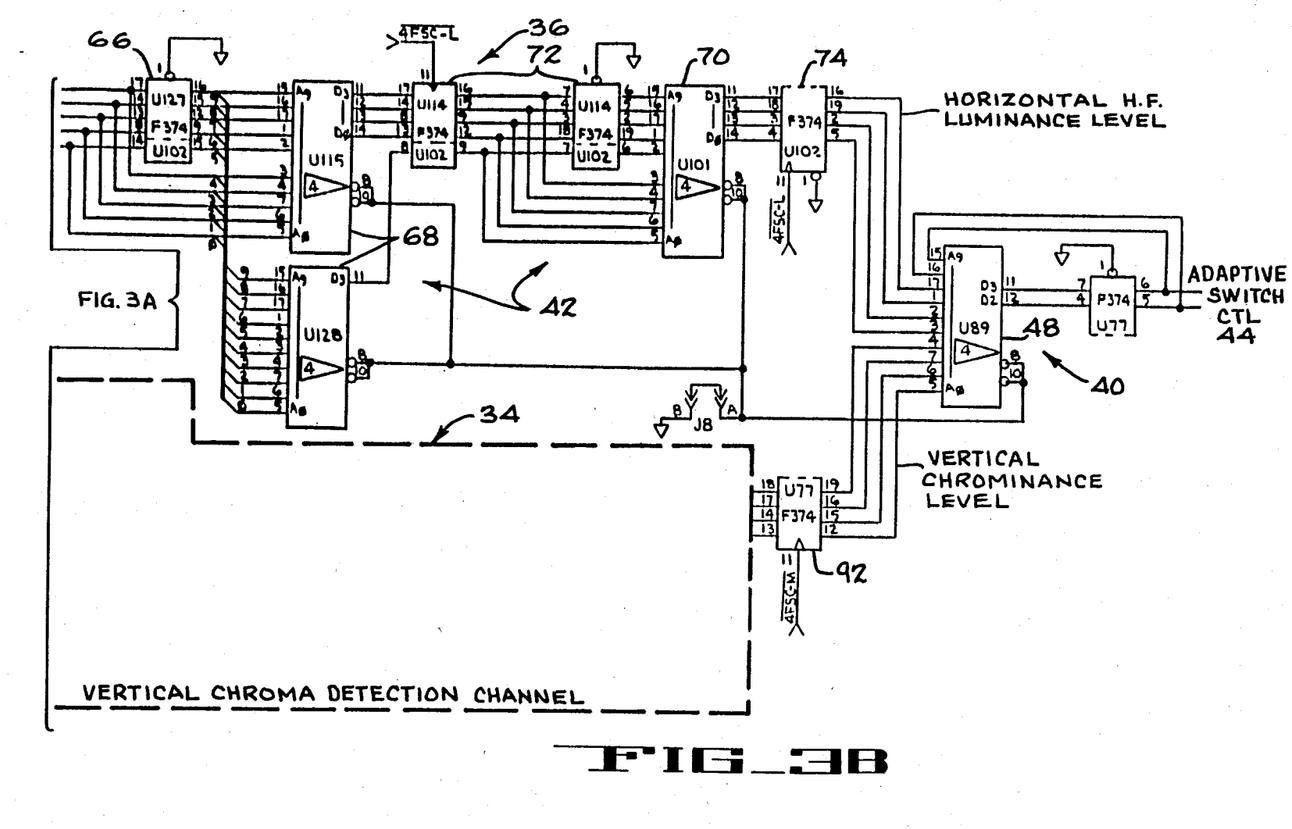

Referring now to FIGS. 3A, 3B, there is shown in greater detail the adaptive switch controller means 18 of the block diagram of FIG. 1. In the two FIGURES, like components are similarly numbered. Since the vertical chrominance detection channel 34 is essentially the same as the horizontal high frequency luminance detection channel 36, only the latter is shown and described in detail. To this end, the negative of the MD signal from 1H delay 20 (FIG. 1) is supplied via a bus 60, while the comb chrominance signal is supplied via a bus 62 to the adder 32, as respective 7-bit words (FIG. 3A). The adder 32 in combination with a multiple exclusive OR-gate 64 comprise a luminance comb filter, whose output thence is supplied as a pair of 5-bit words to a PROM 68 of the RMS luminance level detector 42, via a latch 66 (FIG. 3B). The output of the PROM 68 is fed to a second PROM 70 via a further latch 72 as a pair of 5-bit words. The PROM 70 thence supplies the horizontal high frequency luminance level to the PROM 48 of the comparison function means 40 via a latch 74. The latches 66, 72, 74 are clocked by respective 4Fsc clock signals derived from the clock distributor 49 depicted in FIG. 1. The PROMs 68, 70 square the two 5-bit words, add them together and take the square root of the summation by means of stored look-up tables. The process is performed twice by the two PROMs to provide the square root of the sum of the squares of the three line data samples. The output of the adder 32 is a sine wave which, because of the bandpass filter 12, has a frequency about equal to the subcarrier frequency. As previously mentioned, the sine wave is converted by the RMS level detector 42 to a DC level which represents the amplitude of the sine wave and is the signal fed to the PROM 48. The output of the comparison function means 40 is a digital 2-bit word on the control lines 44 coupled to the adaptive switch 26 of previous mention.

The circuitry for the vertical chrominance level detection channel 34, depicted in dashed lines, is essentially the same as that of the channel 36. The TD signal is supplied on a bus 78 to a block of inverters 80, which supply thus a negative TD signal on a bus 82 (FIG. 3A). The MD signal is supplied via a bus 86 to the vertical chrominance detection channel 34. In the NTSC and PAL standard systems, the negative TD signal and the BD signal are supplied in the form of 4-bit words via the buses 82, 86 respectively, to a pair of adders (not shown) which form the adder 30 in the vertical chrominance detector channel 34 (FIG. 1). The output of the RMS level detector 42 within the channel 34 is supplied to a latch 92 (FIG. 3B) at the output thereof, and thence to the PROM 48 of the comparison function means 40. The latch 92 compensates for a slight delay generated in the TD signal path by the delay 21, to insure that the two 4-bit words arrive at the PROM 48 simultaneously.

Although specific implementations are depicted in FIG. 3 for the adaptive switch controller 18, any other circuit configuration which provides a chrominance level and luminance level indicative of the chrominance and luminance detail, may be employed.

Figure 4:
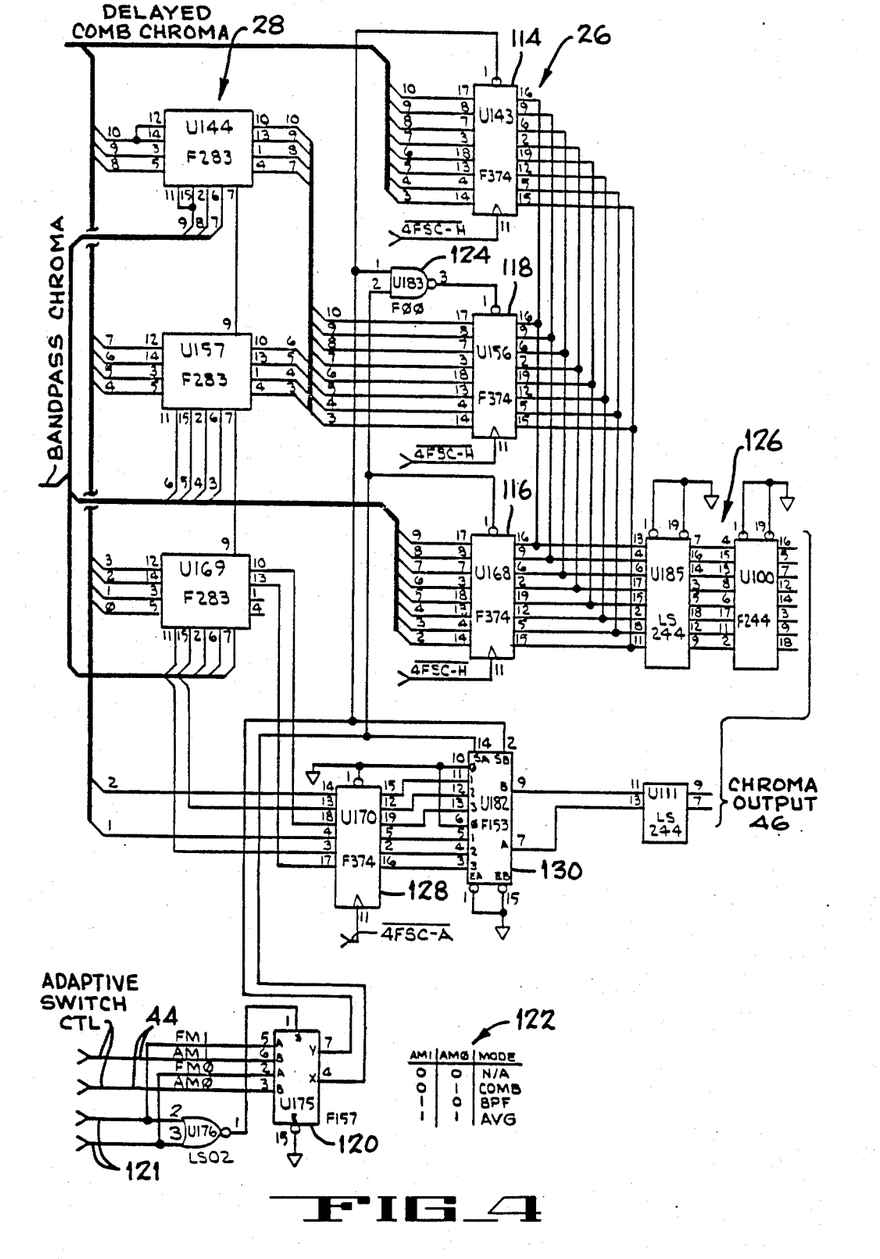
FIG. 4 is a schematic diagram of an implementation of the adaptive switch circuitry of the invention combination depicted in FIG. 1.

Referring to FIG. 4, the adaptive switch circuitry 26 of FIG. 1 is illustrated in more detail, wherein like components are similarly numbered. The output of the adder 25 (FIG. 1) is the comb chrominance signal of previous mention which is supplied to the adder 28 and to position-1 of the adaptive switch 26, herein depicted as a register 114. The comb chrominance signal from the adder 25 also is supplied to the adder 32 of FIG. 1 via the data bus 62 (FIG. 3A). The negative MD signal corresponding to the bandpass chrominance is supplied to the adder 28 and also to position-3 of adaptive switch 26, herein depicted as a register 116. As previously described, the adder 28 generates the average chrominance signal from the bandpass and comb chrominance signals, and supplies it to position-2 depicted herein as a register 118. It may be seen that the registers 114, 116 and 118 supply the comb, the bandpass or the average chrominance signal, respectively, as the chrominance output on output bus 46, in response to which register is output-enabled.

To this end, the control lines 44 from the adaptive switch controller means 18, FIGS. 3A, 3B, are fed as adaptive mode control lines AM1, AM0 to a latch 120 which then supplies one of three 2-bit words to selectively enable one of the three registers 114–118 in the manner of a multiplexer (FIG. 4). The latch 120 also receives a pair of signals FM1, FM0 on lines 121 which are derived from system control and provide manual control of switch 26. The latter feature allows an operator to manually select, via system control and control panel switches (not shown), the comb, the bandpass or the average chrominance signal. A truth table 122 is shown near latch 120 which explains the register selection decision, wherein a logic low on line AM1 and a high on AM0 enables register 114 and disables registers 116 and 118 (the latter due to a NAND gate 124 generating a high). This provides the comb chrominance signal on the output bus 46. With reversed logic levels, the register 116 is enabled, passing the 1H delayed bandpass chrominance signal. With two high logic levels, registers 114 and 116 are disabled, and the NAND gate 124 generates a low which enables the register 118 via the NAND gate 124 to supply the average chrominance signal on the output bus 46. The registers are clocked via respective 4Fsc clocks. The chrominance signal is supplied to the chrominance output bus 46 via buffers 126.

A register 128 and multiplexer 130 are used to adaptively switch the least-significant-bits of the signal supplied to the chrominance output bus 46.

Although the present adaptive chrominance separator is herein generally described with reference to a NTSC color television standard, it is similarly operable with the PAL standard as described above. The comb filter 16 is identical in configuration, except that the PAL standard employs 2H delays 20 and 22. Thus while the 1H delays supply data from adjacent lines, the 2H delays effectively look at data two lines away. As well known, in NTSC the chrominance subcarrier phase inverts on alternate lines. In PAL, the phase inverts every two lines of data. Accordingly, the present chroma separator is readily adapted to either PAL or NTSC by switching to 2H or 1H delays 20, 22, respectively. Since the separator is adaptive, it is switched away from the comb filter in those parts of the television picture where resolution may be lost, as when using data spaced more than adjacent lines.

In the SECAM standard, comb filters cannot be used and accordingly, the bandpass position-3 of the adaptive switch 26 is permanently selected via the control signals AM1, AM0 supplied from system control.

What is claimed is:

1. A circuit for separating chrominance and luminance signals via an adaptive selection of a bandpass filter and a comb filter, comprising:
   means for detecting a preselected chrominance and luminance level relationship, and
   means for adaptively switching to at least one of the filters in response to the detection by the detecting means of said preselected chrominance and luminance level relationship.

2. The circuit of claim 1 wherein the detecting means includes:
   means for providing chrominance and luminance signals indicative of the respective magnitudes thereof;
   means for supplying a control signal to the adaptive switching means which is indicative of the preselected chrominance and luminance level relationship.

3. The circuit of claim 2 wherein the means for providing signals includes:
   means for selecting sine waves of magnitudes corresponding to the respective chrominance and luminance signals; and
   means for converting the sine waves to levels corresponding to the respective chrominance and luminance magnitudes.

4. The circuit of claim 2 wherein the supplying means includes:
   comparison means coupled to the signal providing means for comparing the magnitude of the chrominance and luminance signals and for supplying the control signal indicative of the level relationship to the adaptive switching means.

5. The circuit of claim 2 wherein:
   the supplying means provides a control signal indicative of the luminance level being greater than the chrominance level; and
   the adaptive switching means selects the comb filter in response to the control signal.

6. The circuit of claim 2 wherein:
   the supplying means provides a control signal indicative of the chrominance level being greater than the luminance level; and
   the adaptive switching means selects the bandpass filter in response to the control signal.

7. The circuit of claim 2 wherein:
   the supplying means provides a control signal indicative of the chrominance level being substantially the same as the luminance level; and
   the adaptive switch means selects the comb filter and the bandpass filter in combination.

8. The circuit of claim 2 wherein the bandpass filter provides undelayed bottom line data and the comb filter provides 1H delayed middle line data and 2H delayed top line data, wherein the signal providing means includes:
   chrominance adder means for receiving and selectively weighting the bottom line data and the top line data and for providing a sine wave indicative of the magnitude of the chrominance signal; and
   luminance adder means for receiving and selectively weighting the bottom, middle and top line data and for providing a sine wave indicative of the magnitude of the luminance signal.

9. The circuit of claim 8 wherein the signal providing means further includes:
   chrominance detector means for converting the chrominance sine wave to a DC level indicative of the magnitude thereof; and
   luminance detector means for converting the luminance sine wave to a DC level indicative of the magnitude thereof.

10. The circuit of claim 9 further including:
    comparison function means coupled to the chrominance and luminance detector means for storing values indicative of the various relationships between the chrominance and luminance levels and for supplying the control signal in response to a comparison of the stored values and the relative levels.

11. The circuit of claim 2 wherein the adaptive switching means includes:
    register means responsive to the means for supplying and to the chrominance and luminance levels to select a respective filter or filters.

12. A circuit for the adaptive separation of chrominance and luminance signals via a bandpass filter, a comb filter, or a combination of both filters, comprising:
    means coupled to the bandpass and comb filters for detecting the relation of the level of the luminance signal to the level of the chrominance signal; and
    means including a switch for providing separation of the chrominance and luminance by means of at least one of the filters in response to the means for detecting.

13. The circuit of claim 12 including:
    an adder for receiving the selectively weighted signals from the bandpass filter and the comb filter and for generating an average chrominance signal which is one-half of the sum of the bandpass and comb filter combination; and
    said switch being coupled to the adder.

14. The circuit of claim 12 wherein the means for detecting includes:
    adder means for providing sine waves indicative of the magnitude of the chrominance and luminance signals; and
    detector circuits coupled to the adder means for converting the sine waves to respective DC levels.

15. The circuit of claim 14 further including:
    comparison function means coupled to the detector circuits for comparing the levels and for generating an adaptive decision for correspondingly enabling the switch to select the comb filter, the bandpass filter or the combination of both filters.

16. The circuit of claim 15 wherein the chrominance and luminance signals are NTSC color television standard signals.

17. The circuit of claim 15 wherein the chrominance and luminance signals are PAL color television standard signals.

18. A circuit for separating chrominance and luminance signals in a composite color television signal recovered as successive horizontal lines from a recording tape, comprising:
    filter means for providing bottom, middle and top line data from three adjacent horizontal lines and for generating therefrom a comb chrominance signal, a bandpass chrominance signal and an average chrominance signal from the comb and bandpass signals;
    switch means for receiving the comb, bandpass and average chrominance signals; and control means responsive to the relative levels of the chrominance and luminance signals for selectively enabling the switch means to output the bandpass chrominance signal, the average chrominance signals, or the comb chrominance signal.

19. The circuit of claim 18 wherein the control means includes:
   adaptive switch controller means coupled to the filter means for receiving the bottom, middle and top line data and for generating a control signal indicative of the relative levels of the chrominance and luminance signals; and
   said switch means being coupled to the controller means and responsive to the control signal therefrom.

20. The circuit of claim 19 wherein the adaptive switch controller means includes;
   chrominance detector means for receiving the middle and top line data and for generating a chrominance level indicative of the chrominance signal;
   luminance detector means for operatively receiving the bottom, middle and top line data and for generating a luminance level indicative of the luminance signal; and
   comparison means coupled to the chrominance and luminance detector means for generating the control signal indicative of the relative levels.

21. The circuit of claim 20 wherein the comparison means includes:
   a PROM for storing values indicative of the various relationships between the chrominance and luminance levels and for supplying the control signal in response to a comparison of the stored values and the relative levels.

22. The circuit of claim 21 wherein:
   said chrominance detector means include a chrominance adder and a chrominance RMS level detector coupled to the chrominance adder;
   said luminance detector means include a luminance adder and a luminance RMS level detector coupled to the luminance adder; and
   said PROM is coupled to the chrominance and luminance RMS level detectors.

23. The circuit of claim 18 wherein the composite color television signal is recovered as successive digital samples of the horizontal lines and wherein:
   said filter means provides the comb, bandpass and average chrominance signals on a sample-by-sample basis; and
   said control means selectively enables the switch means on a corresponding sample-by-sample basis.

24. A method for separating chrominance and luminance signals via bandpass filtering and comb filtering processes, comprising:
   detecting a preselected relationship between the relative levels of the chrominance signal and the luminance signal; and
   adaptively switching to at least one of the filtering processes in response to the detecting of said preselected chrominance and luminance level relationship.

25. The method of claim 24 including:
   comparing the magnitudes of the chrominance and luminance signals; and
   supplying a control signal indicative of the magnitude level relationship for adaptively switching to one of the filtering processes.

26. The method of claim 25 including:
   selecting sine waves of magnitudes corresponding to the respective chrominance and luminance levels; and
   converting the sine waves to DC levels corresponding to the respective chrominance and luminance levels.

27. The method of claim 25 further including:
   selectively weighting the bandpass and comb filtered signals; and
   generating an average chrominance signal which is one-half the sum of the bandpass and comb filtered signals.

* * * * *

UNITED STATES PATENT AND TRADEMARK OFFICE
CERTIFICATE OF CORRECTION

PATENT NO. : 4,688,080

DATED : August 18, 1987

INVENTOR(S) : Steven D. Wagner

It is certified that error appears in the above-identified patent and that said Letters Patent is hereby corrected as shown below:

Column 10, line 27, after "luminance" insert --signals--;

line 31, after receiving, delete "the".

Signed and Sealed this

Fifteenth Day of March, 1988

Attest:

DONALD J. QUIGG

Attesting Officer

Commissioner of Patents and Trademarks